(12) United States Patent
Kudoh (10) Patent No.: US 9,817,204 B2
(45) Date of Patent: Nov. 14, 2017

(54) LENS BARREL, AND IMAGE PICKUP APPARATUS HAVING THE SAME

(71) Applicant: CANON KABUSHIKI KAISHA, Tokyo (JP)

(72) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 14/577,732

(22) Filed: Dec. 19, 2014

(65) Prior Publication Data

US 2015/0177476 A1 Jun. 25, 2015

(30) Foreign Application Priority Data

Dec. 25, 2013 (JP) ................................. 2013-267300

(51) Int. Cl.

| G02B 7/02 | (2006.01) |
| G02B 7/08 | (2006.01) |
| G03B 3/10 | (2006.01) |
| G03B 17/04 | (2006.01) |

(52) U.S. Cl.
CPC ............. *G02B 7/026* (2013.01); *G02B 7/08* (2013.01); *G03B 3/10* (2013.01); *G03B 17/04* (2013.01); *G03B 2205/0046* (2013.01)

(58) Field of Classification Search
CPC ........... G02B 7/02; G02B 7/021; G02B 7/026
USPC ................. 359/819, 822, 825, 826, 829, 830
See application file for complete search history.

(56) References Cited

U.S. PATENT DOCUMENTS

| 5,335,115 A | 8/1994 | Kawai et al. |
| 2004/0051970 A1* | 3/2004 | Nomura ................... 359/701 |

FOREIGN PATENT DOCUMENTS

| CN | 1337593 A | 2/2002 |
| CN | 102841426 A | 12/2012 |
| JP | 2007-004030 A | 1/2001 |

OTHER PUBLICATIONS

The Sep. 5, 2016 Chinese Office Action that issued in Chinese Patent Application No. 201410815337.8.

\* cited by examiner

*Primary Examiner* — James Greece
(74) *Attorney, Agent, or Firm* — Cowan, Liebowitz & Latman, P.C.

(57) ABSTRACT

A lens barrel which is capable of accurately performing positioning of lenses and preventing a mounted external barrel unit from coming off unexpectedly. The lens barrel comprises a fixed cam ring having a rotation regulating cam groove disposed on an inner circumferential surface thereof, the cam groove opening to an object side end part thereof in an optical axis direction of the lens barrel, a movable cam ring received in the fixed cam ring, and an external barrel unit having, on an outer circumferential surface thereof, a rotation regulating section engaged with the rotation regulating cam groove. The external barrel unit is received in the fixed cam ring and outwardly fitted on the movable cam ring. The rotation regulating cam groove has a movement-regulating section, configured to regulate movement of the rotation regulating section in the optical axis direction, at an object side end part thereof in the optical axis direction.

8 Claims, 9 Drawing Sheets

LENS BARREL, AND IMAGE PICKUP APPARATUS HAVING THE SAME

BACKGROUND OF THE INVENTION

Field of the Invention

The present invention relates to a lens barrel and an image pickup apparatus having the lens barrel.

Description of the Related Art

A digital camera is provided with a zoom mechanism for changing image pickup magnification by a lens barrel having a plurality of lenses. The lens barrel is assembled by assembling a plurality of cam barrels in order from an object side in an optical axis direction and mounting a sensor holder from an image pickup device side in the optical axis direction last.

In this regard, each of the cam barrels and lens groups is assembled against a cam groove by a cam in an assembling phase area on the image pickup device side in the optical axis direction, the assembling phase area being nearer to the image pickup device than the end of the storage space of the cam barrel. The cam is rotated to the object side in the optical axis direction a little from the end of the storage space of the cam barrel, and the sensor holder as a stopper is provided so that the cam barrel does not rotate upto the assembling phase area (see Japanese Laid-Open Patent Publication (Kokai) No. 2007-4030, for example).

However, the lens barrel assembled by mounting the sensor holder is not capable of adjusting the optical lenses inside the lens barrel after the sensor holder has been mounted. For this reason, in the case of desiring to adjust the optical lenses while assembling the lens barrel, it is not possible to advance to the assembly work after the sensor holder has been mounted.

In the recent digital camera market, it is required to provide a lens barrel capable of high-magnification zooming with the downsizing promoted. That is, it is necessary to improve the sensitivity of a lens group, positioned on the object side in the optical axis direction at the time of performing image pickup, among lens groups disposed in a digital camera, and to accurately determine a lens position.

Such a lens barrel is provided with a fixed cam ring, a movable cam ring having a plurality of lens groups built-in and received in the fixed cam ring, and an external barrel unit fixed to the mobile cam ring. In order to accurately perform positioning of lenses, it is desirable to mount the external barrel unit of the lens barrel from the object side in the optical axis direction after having performed lens adjustment from the object side in the optical axis direction. Furthermore, it is desirable that the external barrel unit is removable so that positioning of the lenses can be performed again after the external barrel unit having been mounted, which may, however, cause the external barrel unit to unexpectedly come off during a time period after the mounting until the removal.

SUMMARY OF THE INVENTION

The present invention provides a lens barrel which is capable of accurately performing positioning of lenses and preventing a mounted external barrel unit from coming off unexpectedly, and an image pickup apparatus having the lens barrel.

In an aspect of the invention, there is provided a lens barrel comprising: a fixed cam ring having a rotation regulating cam groove disposed on an inner circumferential surface thereof, the cam groove opening to an object side end part thereof in an optical axis direction of the lens barrel; a movable cam ring received in the fixed cam ring; and an external barrel unit having, on an outer circumferential surface thereof, a rotation regulating section engaged with the rotation regulating cam groove, the external barrel unit being received in the fixed cam ring and outwardly fitted on the movable cam ring, wherein the rotation regulating cam groove has a movement-regulating section, configured to regulate movement of the rotation regulating section in the optical axis direction, at an object side end part thereof in the optical axis direction.

According to the present invention, it is possible to accurately perform positioning of lenses and prevent a mounted external barrel unit from coming off unexpectedly.

Further features of the present invention will become apparent from the following description of exemplary embodiments with reference to the attached drawings.

DESCRIPTION OF THE EMBODIMENTS

An embodiment of the present invention now will be described in detail with reference to the attached drawings.

Figure 1:
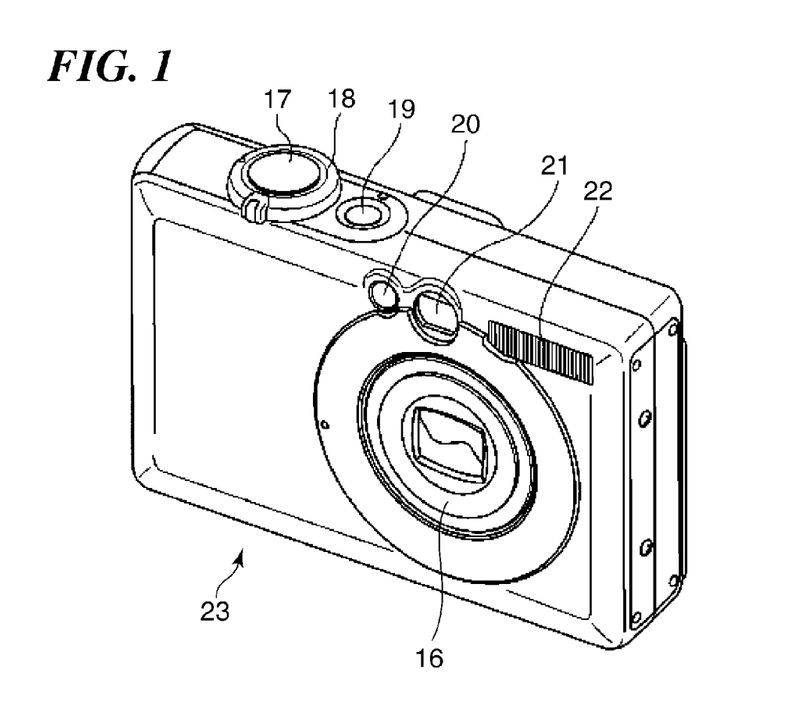
FIG. 1 is a front perspective view of a digital camera as an image pickup apparatus according to an embodiment of the present invention.

FIG. 1 is a front perspective view of a digital camera 23 as an image pickup apparatus according to an embodiment of the present invention.

A digital camera 23 of FIG. 1 has a lens barrel 16, an auxiliary light emitting section 20, a finder 21, and a strobe 22 disposed thereon on the front side and has a release button 17, a zoom switching switch 18, and a power source switching button 19 disposed thereon on the upper side. The lens barrel 16 has a zoom mechanism of making it possible to change image-pickup magnification, and the auxiliary light emitting section 20 assists a light source at the time of performing photometry and distance measurement.

Figure 2:
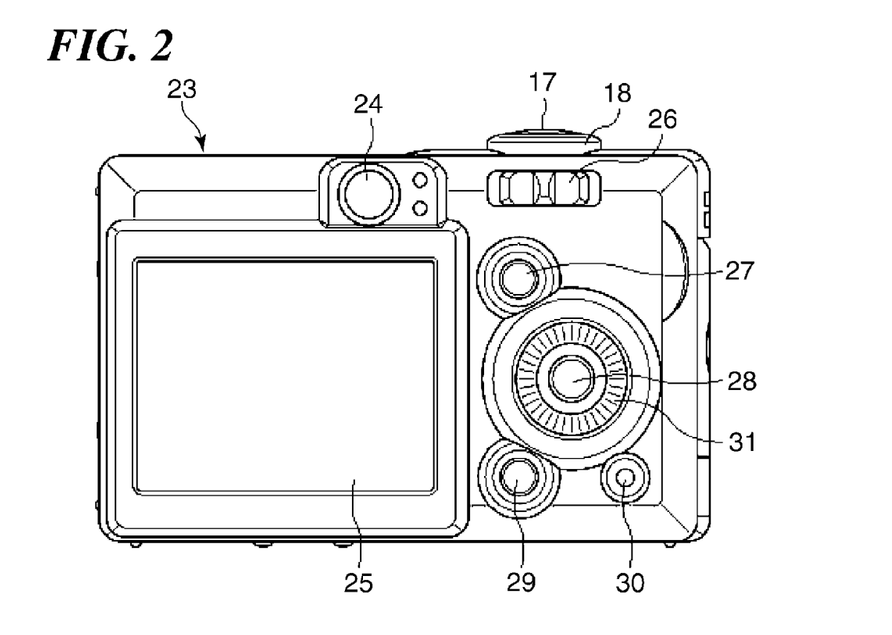
FIG. 2 is a rear view of the digital camera of FIG. 1.

The digital camera 23 of FIG. 1 has operation buttons 26 to 31, a finder eyepiece section 24, and a display 25 disposed thereon on the rear side (FIG. 2). The operation buttons 26 to 31 make it possible to switch among functions of the digital camera 23. The display 25, comprising a liquid crystal display, for example, displays image data stored in a memory 39 to be described later or image data read out from a memory card.

Figure 3:
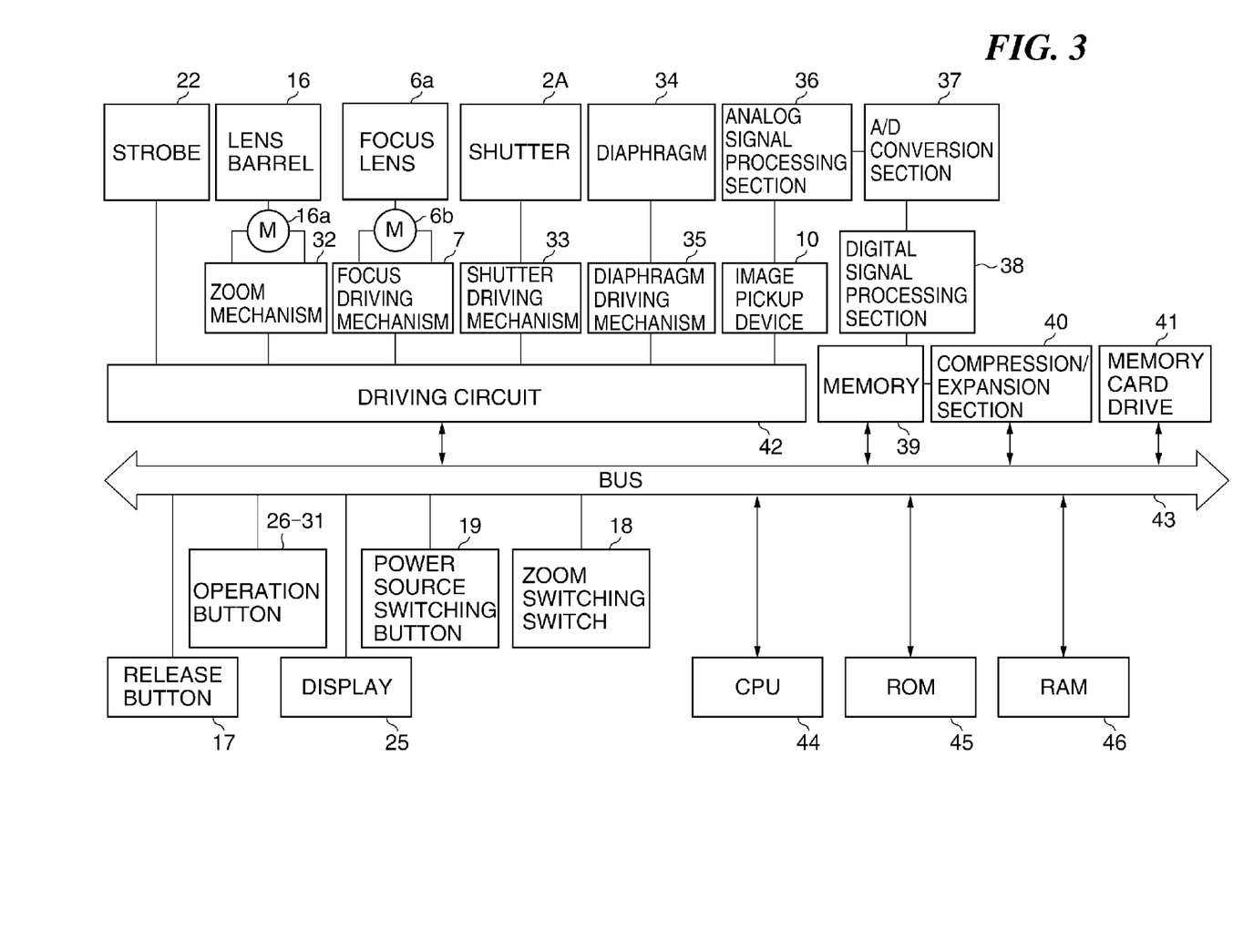
FIG. 3 is a block diagram schematically showing an internal configuration of the digital camera of FIG. 1.

FIG. 3 is a block diagram schematically showing an internal configuration of the digital camera 23 of FIG. 1.

In FIG. 3, the digital camera 23 has not only the release button 17, the zoom switching switch 18, the power source switching button 19, the display 25, and the operation buttons 26 to 31, but also the memory 39, a compression/expansion section 40, a memory card drive 41 for storing image data, a driving circuit 42, a CPU 44, a ROM 45, and a RAM 46, which are connected to one another via a bus 43. The memory 39, the compression/expansion section 40, and the memory card drive 41 are connected in series. To the memory 39 is connected an A/D conversion section 37, via a digital signal processing section 38.

To the driving circuit 42 are connected an image pickup device 10 and the strobe 22, and to the image pickup device 10 is connected an analog signal processing section 36. The analog signal processing section 36 is connected to the A/D conversion section 37. To the driving circuit 42 is connected a focus driving mechanism 7 for driving a focus lens 6a by a motor 6b, a zoom mechanism 32 for driving the lens barrel 16 by a motor 16a, a shutter driving mechanism 33 for driving a shutter 2A, and a diaphragm driving mechanism 35 for driving a diaphragm 34, respectively.

The CPU 44, the ROM 45, and the RAM 46 constitute a control section of the digital camera 23. The CPU 44 controls the whole of the digital camera 23 by reading a program stored in the ROM 45 onto the RAM 46 and executing the program.

The analog signal processing section 36 performs analog signal processing for image data outputted from the image pickup device 10, such as a CCD and a CMOS, and outputs the image data to the A/D conversion section 37. The A/D conversion section 37 converts the analog signal-processed image data to digital data and outputs the digital data to the digital signal processing section 38. The digital signal processing section 38 performs digital signal processing for the digital data and stores the digital data into the memory 39. The image data stored in the memory 39 and the image data stored in the memory card drive 41 are subjected to expansion processing by the compression/expansion section 40, and the expansion-processed image data is displayed on the display 25 via the bus 43.

Figure 4:
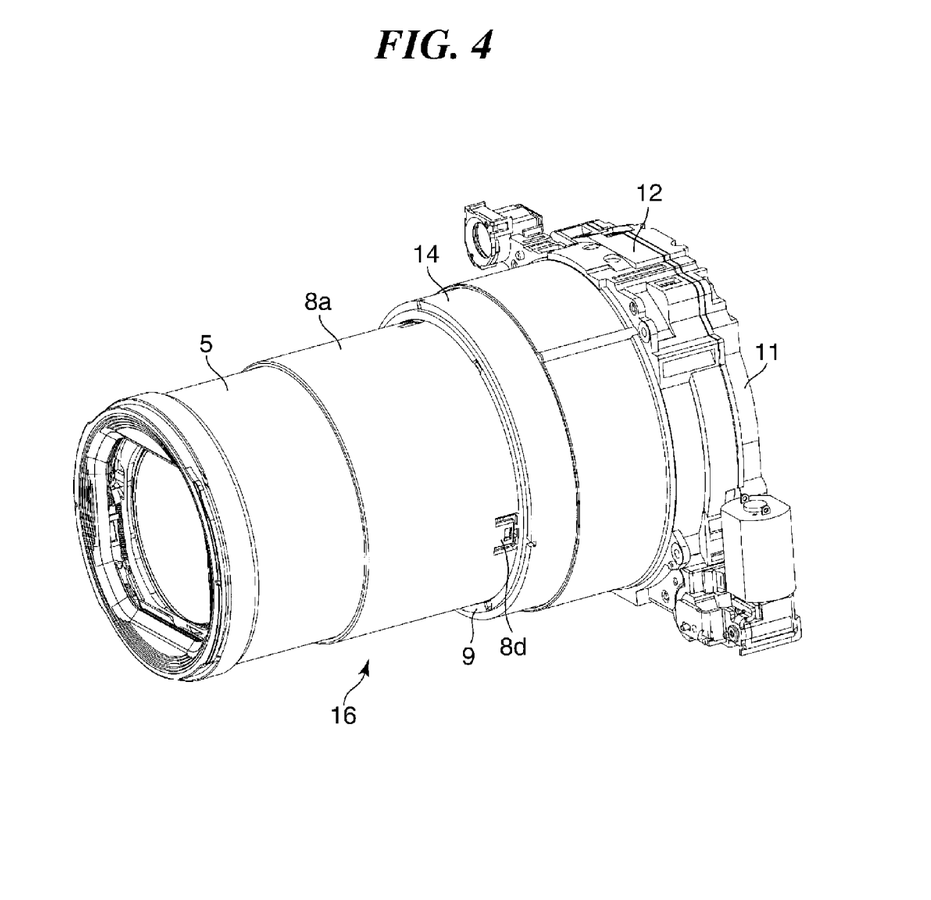
FIG. 4 is a perspective view of a lens barrel in the digital camera of FIG. 1.

FIG. 4 is a perspective view of the lens barrel 16 in the digital camera 23 of FIG. 1.

The lens barrel 16 of FIG. 4 is provided with a fifth lens group 5, an external barrel unit 8a, a fixed cam ring 9, an image pickup device-holding unit 11, a cover barrel 12, and a driving ring 14.

The fifth lens group 5 is received movably back and forth in an annular space between a movable cam ring 8 to be described later with reference to FIG. 6 and the external barrel unit 8a outwardly fitted on the movable cam ring 8. The external barrel unit 8a is received back and forth in the fixed cam ring 9 together with the movable cam ring 8, and the driving ring 14 is outwardly on the fixed cam ring 9. The fixed cam ring 9 is fixed to the image pickup device-holding unit 11.

The external barrel unit 8a has snap fits 8d disposed on an outer circumferential surface thereof at an image pickup device-side end thereof at three positions at regular angular intervals in the circumference direction and is fixed to the movable cam ring 8 via the snap fits 8d. The driving ring 14 is covered with and protected by the cover barrel 12 which is fixed to the image pickup device-holding unit 11. Rotation of the driving ring 14 allows the fifth lens group 5 and the external barrel unit 8a (movable cam ring 8) to move back and forth in the optical axis direction.

Figure 5:
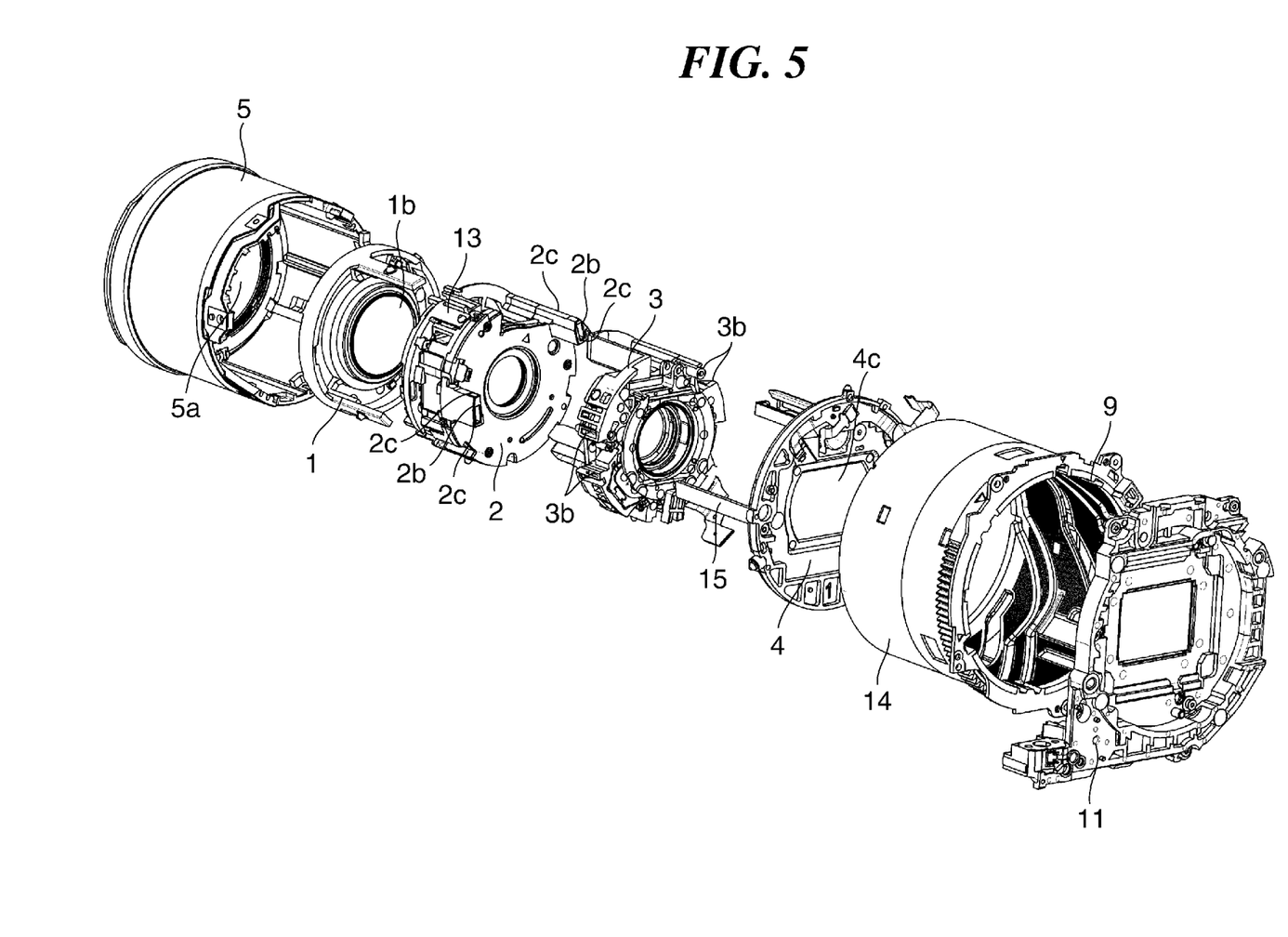
FIG. 5 is an exploded perspective view of the lens barrel of FIG. 4.
Figure 6:
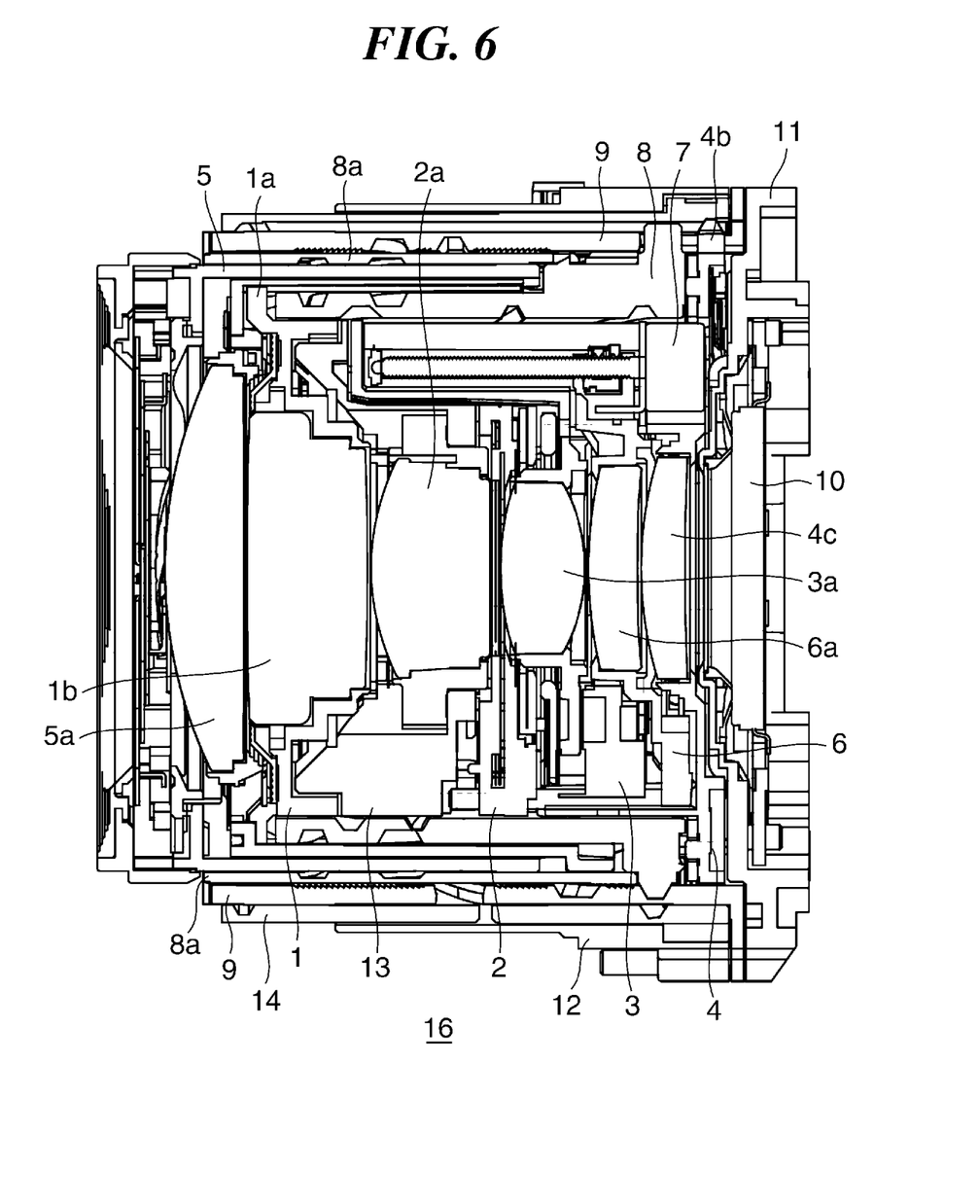
FIG. 6 is a longitudinal sectional view of the lens barrel of FIG. 4 which is in a collapsed state.
Figure 7:
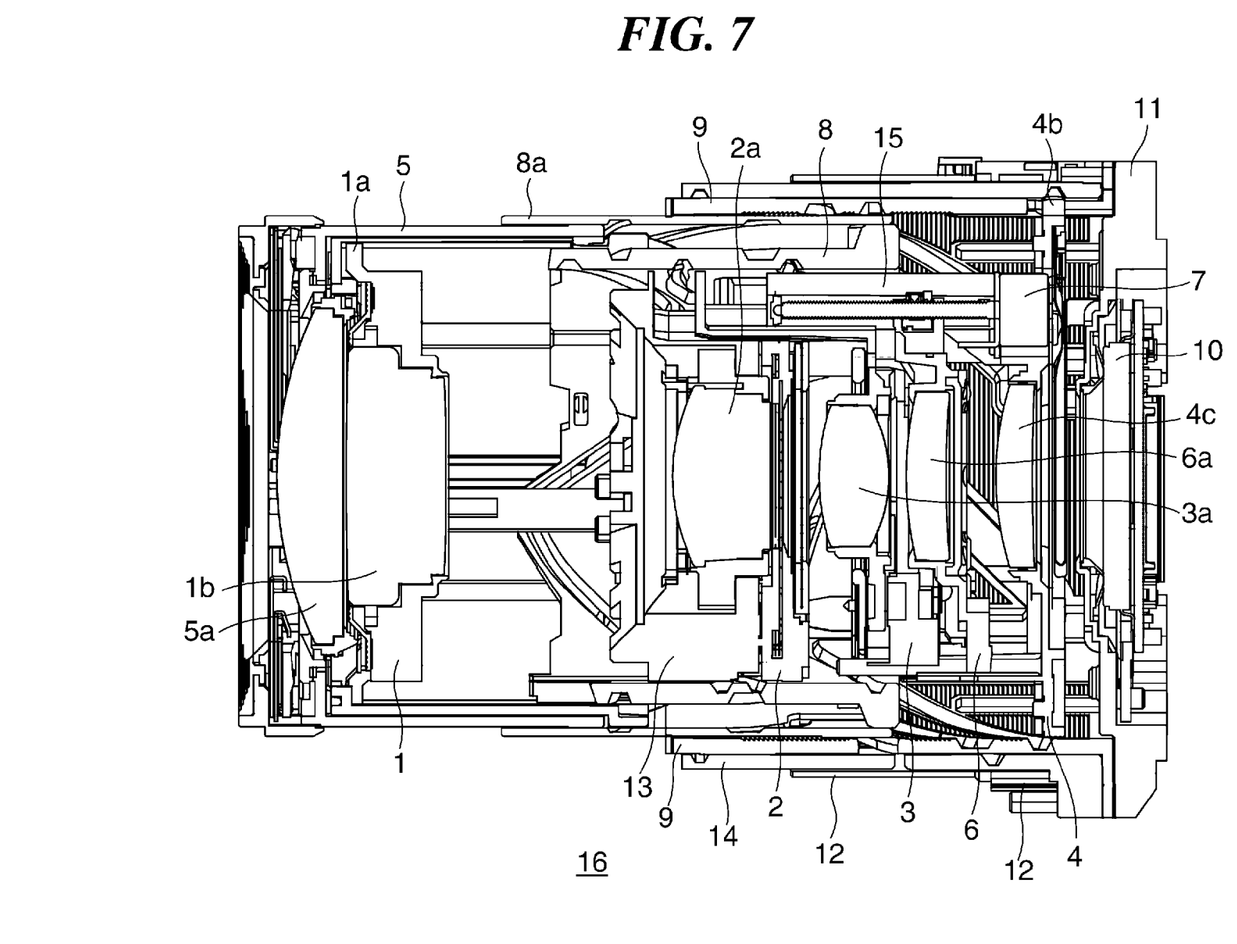
FIG. 7 is a longitudinal sectional view of the lens barrel of FIG. 4 which is in an image pickup state.

FIG. 5 is an exploded perspective view of the lens barrel 16 of FIG. 4, FIG. 6 is a sectional view of the lens barrel 16 of FIG. 4 which is in a collapsed state, and FIG. 7 is a sectional view of the lens barrel 16 of FIG. 4 which is in an image pickup state.

The lens barrel 16 of FIG. 5 is provided with the fifth lens group 5, a first lens group 1, a second lens group 2, a third lens group 3, a fourth lens group 4, the driving ring 14, the fixed cam ring 9, and the image pickup device-holding unit 11 in the order named from the object side in the optical axis direction. The descriptions below will be made with FIGS. 6 and 7 referred to as required.

In FIG. 5, the fifth lens group 5 is provided with a fifth image pickup lens 5a and a fifth lens group-straight travel-regulated section (not shown). The first lens group 1 is disposed on the fifth lens group 5 on the optical axis direction-image pickup device side. The first lens group 1 is provided with a first image pickup lens 1b, a fifth lens group-straight travel-regulating section 1a, and a first lens group-straight travel-regulated section (not shown).

The second lens group 2 is provided with a second lens holding section 13 having a second image pickup lens 2a, and a shutter section (not shown) disposed on the second lens holding section 13 on the optical axis direction-image pickup device side.

The second lens group 2 is provided with a sheath-shaped straight travel-regulated section 2b and a third lens group-straight travel-regulating section 2c surrounding the straight travel-regulated section 2b and further provided with a first lens group-straight travel-regulating section (not shown). The first lens group-straight travel-regulating section of the second lens group 2 engaging with the first lens group-straight travel-regulated section of the first lens group 1 allows straight travel of the first lens group 1 to be regulated.

The third lens group 3 as a vibration-proof lens group is disposed on the second lens group 2 on the optical axis direction-image pickup device side, and provided with a third image pickup lens 3a and a third lens group-straight travel-regulated section 3b. The third lens group-straight travel-regulated section 3b of the third lens group 3 engaging with the third lens group-straight travel-regulating section 2c of the second lens group 2 allows the straight travel of the third lens group 3 to be regulated.

The fourth lens group 4 is disposed on the third lens group 3 on the optical axis direction-image pickup device side and is provided with a fourth straight travel-regulated section (not shown), a fourth follower section 4b, a fourth image pickup lens 4c, a focus lens 6a, a focus lens-holding section 6 which holds the focus lens 6a, the focus driving mechanism 7, and a focus base unit (not shown as a whole) which holds the focus driving mechanism 7.

The focus base unit of the fourth lens group 4 is provided with a straight travel-regulating section 15 which is engaged with the sheath-shaped straight travel-regulated section 2b of the shutter section disposed in the second lens group 2, which allows the straight travel-regulated section 2b and the straight travel-regulating section 15 to be paired.

The fifth lens group 5 has a pin and can move back and forth in the optical axis direction by the pin being guided by a cam groove disposed on the outer circumferential surface of the movable cam ring 8.

The first lens group 1, the second lens group 2, and the third lens group 3, each of which having a pin, can move back and forth in the optical axis direction by their respective pins being guided by three cam grooves disposed on the inner circumferential surface of the movable cam ring 8, respectively.

The focus driving mechanism 7 is fixed to the focus base unit (not shown) of the fourth lens group 4, and brings the camera into focus by moving the focus lens holding section 6 in the optical axis direction.

The driving ring 14 rotates outside the fixed cam ring 9 by the zoom mechanism 32 (FIG. 3). Rotation of the driving ring 14 allows the movable cam ring 8 to move back and forth in the optical axis direction while rotating inside the fixed cam ring 9, which allows the first lens group 1, the second lens group 2, the third lens group 3, the fourth lens group 4, and the fifth lens group 5 to move back and forth in the optical axis direction.

Figure 8A:
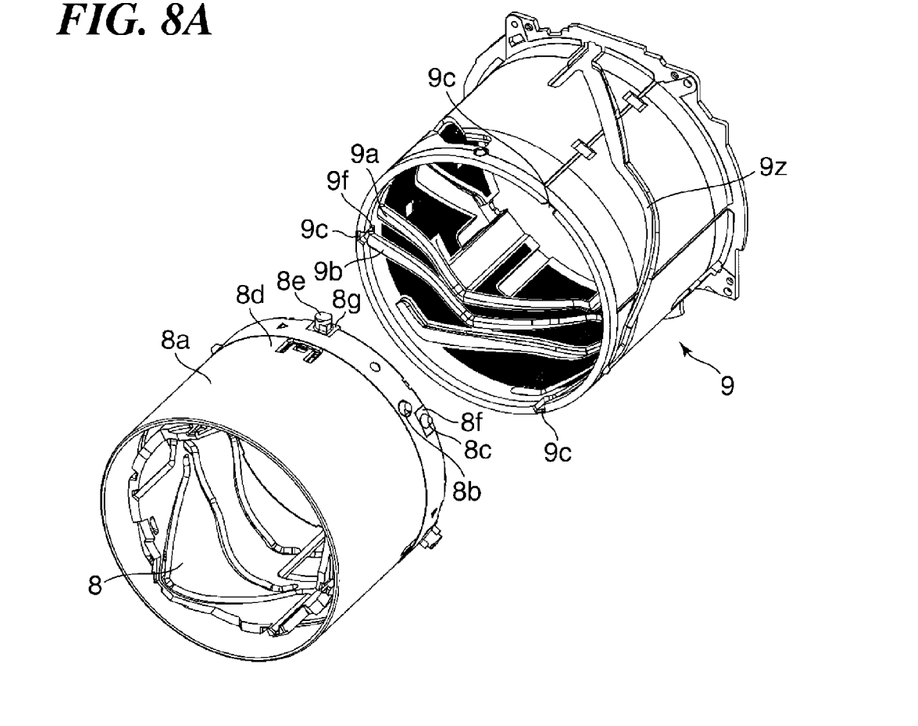
FIG. 8A is a partial exploded perspective view of a movable cam ring and a fixed cam ring constituting the lens barrel of FIG. 4.
Figure 8B:
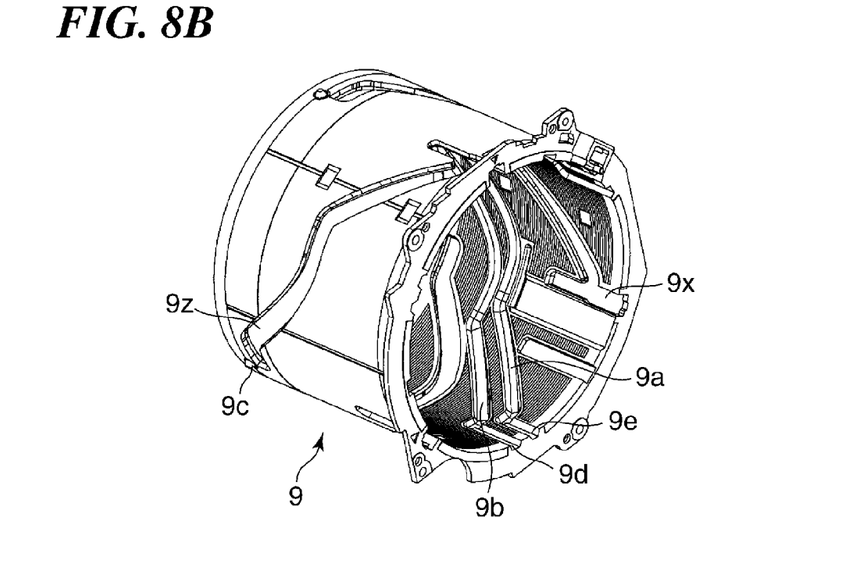
FIG. 8B is a rear perspective view of the fixed cam ring in FIG. 8A.
Figure 8C:
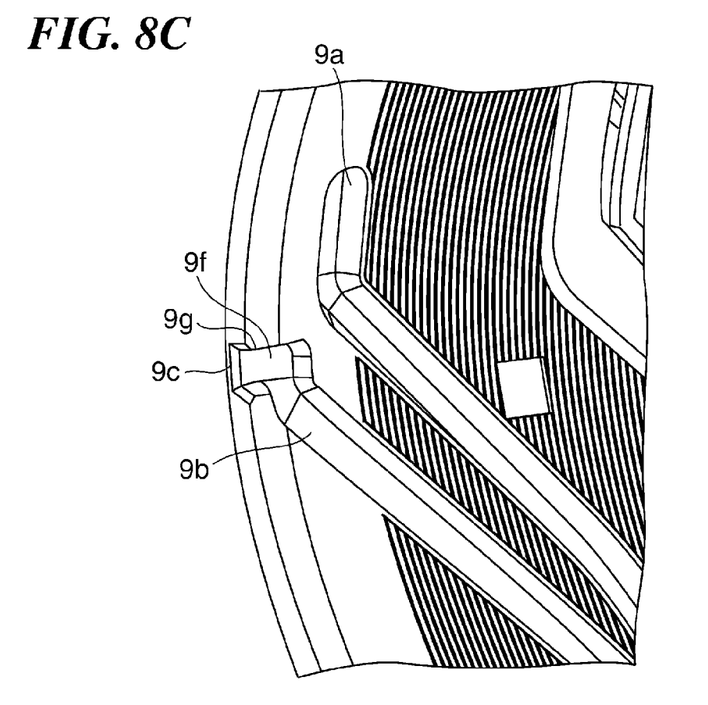
FIG. 8C is an enlarged view of a rotation regulating groove of the fixed cam ring in FIG. 8A.
Figure 8D:
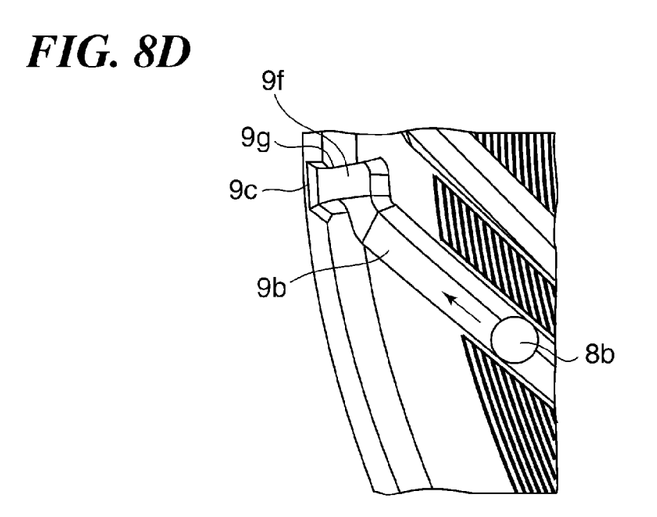
FIG. 8D is a view showing a rotation regulating section which moves inside the rotation regulating cam groove in FIG. 8C toward an object side in an optical axis direction inside.

FIG. 8A is a partial exploded perspective view of the movable cam ring 8 and the fixed cam ring 9 constituting the lens barrel 16 in FIG. 4, and FIG. 8B is a rear perspective view of the fixed cam ring 9 in FIG. 8A.

In FIG. 8A, the fixed cam ring 9 has three rotation regulating slits 9z on a circumferential part thereof and further has three rotation regulating cam grooves 9a and three rotation regulating cam grooves 9b on an inner circumferential surface thereof. Each of the rotation regulating cam grooves 9b is provided with an optical axis direction-movement-regulating section 9f at an object side end part thereof in the optical axis direction, and to each of the optical axis direction-movement-regulating sections 9f is connected an optical axis direction-external barrel unit-assembling groove 9c which opens to an object side end thereof in the optical axis direction.

In FIG. 8B, the fixed cam ring 9 is provided with the rotation regulating slits 9z, optical axis direction-slit-shaped holding sections 9x disposed on the image pickup device side end parts of the rotation regulating slits 9z, respectively, and three optical axis direction-movable cam ring-assembling grooves 9d and three optical axis direction-movable cam ring-assembling grooves 9e which are engaged with rotation regulating sections 8b and movable cam ring followers 8c, to be described later, respectively.

The movable cam ring 8 is provided with three pins 8e and the three movable cam ring followers 8c disposed on the image pickup device side end parts of the movable cam ring 8. The external barrel unit 8a is provided with not only the three snap fits 8d, but also notch parts 8f, 8g, the truncated cone-shaped rotation regulating sections 8b at three positions at regular angular intervals in the circumference direction. As described later, when the external barrel unit 8a is outwardly fitted onto the movable cam ring 8 via the snap fits 8d, the movable cam ring followers 8c and the pins 8e of the movable cam rings 8 project from the notch parts 8f and the notch parts 8g of the external barrel unit 8a, respectively.

With the above configuration, the movable cam ring 8 moves, while rotating, toward the optical axis direction-object side of the lens barrel 16 by the movable cam ring followers 8c being guided along the cam grooves 9a of the fixed cam ring 9, respectively, and the external barrel unit 8a moves, while rotating, toward the optical axis direction-object side of the lens barrel 16 by the rotation regulating sections 8b being guided along the rotation regulating cam grooves 9b, respectively.

A procedure will be now described of assembling the lens barrel 16 with reference to FIGS. 8A-8D.

The movable cam ring 8 having the first to fourth lens groups 1 to 4 received therein is inserted from the optical axis direction-image pickup device side of the fixed cam ring 9. In this regard, the pins 8e of the movable cam ring 8 are engaged with the rotation regulating slits 9z via the slit-shaped holding sections 9x of the fixed cam ring 9, and the movable cam ring followers 8c of the movable cam ring 8 are engaged with the cam grooves 9a via the movable cam ring-assembly grooves 9e, respectively, which enables the movable cam ring 8 and the fixed cam ring 9 to be coupled to each other.

Next, the driving ring 14, the cover barrel 12, and the image pickup device-holding unit 11 are mounted in the order named. At this stage, positioning of the lenses can be performed by performing lens adjustment for adjusting lens tilt, eccentricity and the like.

Next, the fifth lens group 5 is mounted when the movable cam ring 8 coupled to the fixed cam ring 9 is positioned in a projecting-side assembling phase, and the lens position of the fifth lens group 5 is determined. Thereafter, the external barrel unit 8a is coupled to the movable cam ring 8 via the snap fits 8d with the rotation regulating sections 8b engaged with the external barrel unit-assembling groove 9c. In other words, the external barrel unit-assembling groove 9c is formed as an opening through which the external barrel unit 8a can be mounted on the movable cam ring 8 after having determined the lens position of the fifth lens group 5, and the movable cam ring 8 coupled to the external barrel unit 8a covers the fifth lens group 5 on the optical axis direction-image pickup device side. Specifically, the first to fourth lens groups 1 to 4 received in the movable cam ring 8 cover the fifth lens group 5 on the optical axis direction-image pickup device side.

By separating, after having mounted the external barrel unit 8a, the rotation regulating sections 8b from the external barrel unit-assembling groove 9c again, the external barrel unit 8a can be removed from the fixed cam ring 9. The fifth lens group 5 is exposed then, and the lens position of the fifth lens group 5 can be adjusted.

Figure 8E:
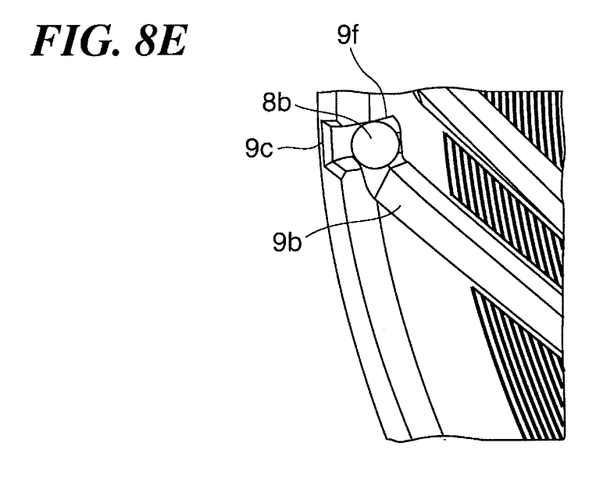
FIG. 8E is a view showing a case in which the rotation regulation section abuts against a movement-regulating section in FIG. 8D.
Figure 8F:
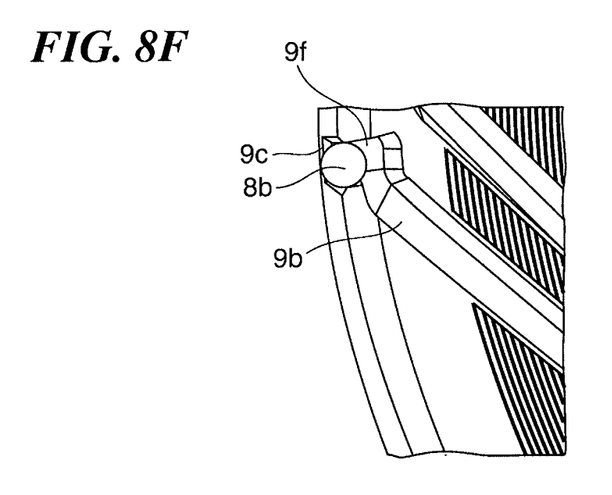
FIG. 8F is a view showing a case in which the rotation regulation section is positioned in an external barrel unit-assembling groove in FIG. 8D.

On the other hand, in the case of a structure in which the mounted external barrel unit 8a can be easily removed, there may be a case where not only the external barrel unit 8a but also the fifth lens group 5 falls off. For this reason, the optical axis direction-movement-regulating section 9f for preventing the external barrel unit 8a from falling off is disposed in the optical axis direction-object side end part of the rotation regulating cam groove 9b. The optical axis direction-movement-regulating section 9f is formed as a cam groove, having a side face 9g, such that the side face 9g intersects with an extending direction of the rotation regulating cam groove 9b at the optical axis direction-object side end part. The optical axis direction-movement-regulating section 9f is formed as a stopper structure having a stopper function of regulating movement of the rotation regulating section 8b by causing the rotation regulating section 8b to abut against the side face 9g. For example, even if the rotation regulating section 8b engaged with the rotation regulating cam groove 9b moves toward the optical axis direction-object side (the arrow direction in FIG. 8D) from a predetermined position of the rotation regulating cam groove 9b (FIG. 8D), the rotation regulating section 8b comes against the optical axis direction-movement-regulating section 9f (FIG. 8E), which causes the movement of the rotation regulating section 8b to be regulated. In this regard, since the external barrel unit-assembling groove 9c mentioned above extends in a direction different from the extending direction of the rotation regulating cam groove 9b toward the optical axis direction-object side, the rotation regulating section 8b cannot move to the external barrel unit-assembling groove 9c (FIG. 8F) even if it moves in the extending direction of the rotation regulating cam groove 9b toward the optical axis direction-object side. This prevents the external barrel unit 8a and the fifth lens group 5 from falling off.

With the above configuration, it is possible to prevent the external barrel unit 8a from falling off from the fixed cam ring 9 to the optical axis-direction object side without especially adding a new part to the external barrel unit 8a. Furthermore, since it is possible to mount the external barrel unit 8a after having mounted the image pickup device-holding unit 11 and to remove the mounted external barrel unit 8a from the fixed cam ring 9 in the assembling process of the lens barrel 16, it is possible to accurately determine the lens position of a lens group positioned on the optical-axis-direction object side.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-267300, filed Dec. 25, 2013 which is hereby incorporated by reference herein in its entirety.

What is claimed is:

1. A lens barrel comprising:
    a fixed cam ring having a first rotation regulating cam groove and a second rotation regulating cam groove disposed on an inner circumferential surface thereof, the second rotation regulating cam groove being different in circumferential phase from the first rotation regulating cam groove, and opening to an object side end part thereof in an optical axis direction of the lens barrel;
    a movable cam ring received in the fixed cam ring and having a cam follower engaged with the first rotation regulating cam groove; and
    an external barrel unit having, on an outer circumferential surface thereof, a rotation regulating section engaged with the second rotation regulating cam groove, the external barrel unit being received in the fixed cam ring and outwardly fitted on the movable cam ring,
    wherein the second rotation regulating cane groove has a movement-regulating section, configured to regulate movement of the rotation regulating section in the optical axis direction, at an object side end part thereof in the optical axis direction.

2. The lens barrel according to claim 1, wherein said second rotation regulating cam groove further has an optical axis direction-assembling groove for the external barrel unit at the object side end part in the optical axis direction.

3. The lens barrel according to claim 1, wherein the movement-regulating section has a stopper structure of regulating movement of the rotation regulating section.

4. The lens barrel according to claim 1, wherein thee movement-regulating section intersects with an extending direction of the second rotation regulating cam groove at the object side end part, and the optical axis direction-assembling groove for the external barrel unit extends in a direction different from the extending direction.

5. The lens barrel according to claim 1, wherein said rotation regulating section is shaped in a truncated cone.

6. An image pickup apparatus having the lens barrel according to claim 1.

7. A lens barrel comprising:
    a fixed cam ring having a first rotation regulating cam groove and a second rotation regulating cam groove disposed on an inner circumferential surface thereof, the second rotation regulating cam groove being different in circumferential phase from the first rotation regulating cam groove, and opening to an object side end part thereof in an optical axis direction of the lens barrel;
    a moveable cam ring received in the fixed cam ring and having a cam follower engaged with the first rotation regulating cam groove; and
    an external barrel unit having, on an outer circumferential surface thereof, a rotation regulating section engaged with the second rotation regulating cam groove, the external barrel unit being received in the fixed cam ring and outwardly fitted on the movable cam ring,
    wherein the second rotation regulating cam groove has a movement-regulating section, configured to regulate movement of the rotation regulating section in the optical axis direction, at an object side end part thereof in the optical axis direction,
    the movement-regulating section intersects with an extending direction of the second rotation regulating cam groove, and
    the first rotation regulating cam groove engaged with the cam follower is formed as a stopper structure having a stopper function of regulating movement of the rotation regulating section in a state where the rotation regulating section is positioned at the movement-regulating section.

8. An image pickup apparatus having the lens barrel according to claim 7.

* * * * *